Dec. 26, 1939.   G. R. EGO   2,184,416

EARTH WORKING IMPLEMENT

Filed June 29, 1938

INVENTOR:
GEORGE ROSS EGO

BY Alex. E. MacRae
ATTORNEY.

Patented Dec. 26, 1939

2,184,416

UNITED STATES PATENT OFFICE 2,184,416

EARTH WORKING IMPLEMENT

George Ross Ego, Brantford, Ontario, Canada, assignor to Massey-Harris Company, Limited, Toronto, Ontario, Canada Application June 29, 1938, Serial No. 216,496

4 Claims. (Cl. 97—72)

This invention relates to earth working implements such as plows, cultivators and the like and more particularly to an assisting spring arrangement for the land lever of such implements.

In earth working implements such as gang plows, a power lift mechanism is provided to raise or lower the frame carrying the earth working units. The land lever, which is associated with the power lift mechanism, is manually actuable to adjust the level of the frame whereby the point to which the frame is raised or lowered by the lift mechanism is varied as desired by the operator. A spring is provided to assist the operator in actuating the lever and such spring is usually positioned in fixed relation to the lever. The degree of tension of the spring varies considerably at the two extreme positions of the lever and a disadvantage is that, if the spring tension is correct when the earth working units are in lowered or operating position, it is incorrect when the units are in raised position. The spring is subjected to excessive strain due to an unnecessarily high degree of tension in certain positions. This excessive strain is communicated to certain bearings which causes wear thereof. Moreover, the timing of the power lift mechanism is adversely affected by undesirable forces exerted by the spring.

It is the object of the present invention to provide an assisting spring arrangement for the land lever of plows or similar implements wherein a proper tension is maintained in the spring at all positions of the land lever and of the earth working units.

Figure 1:
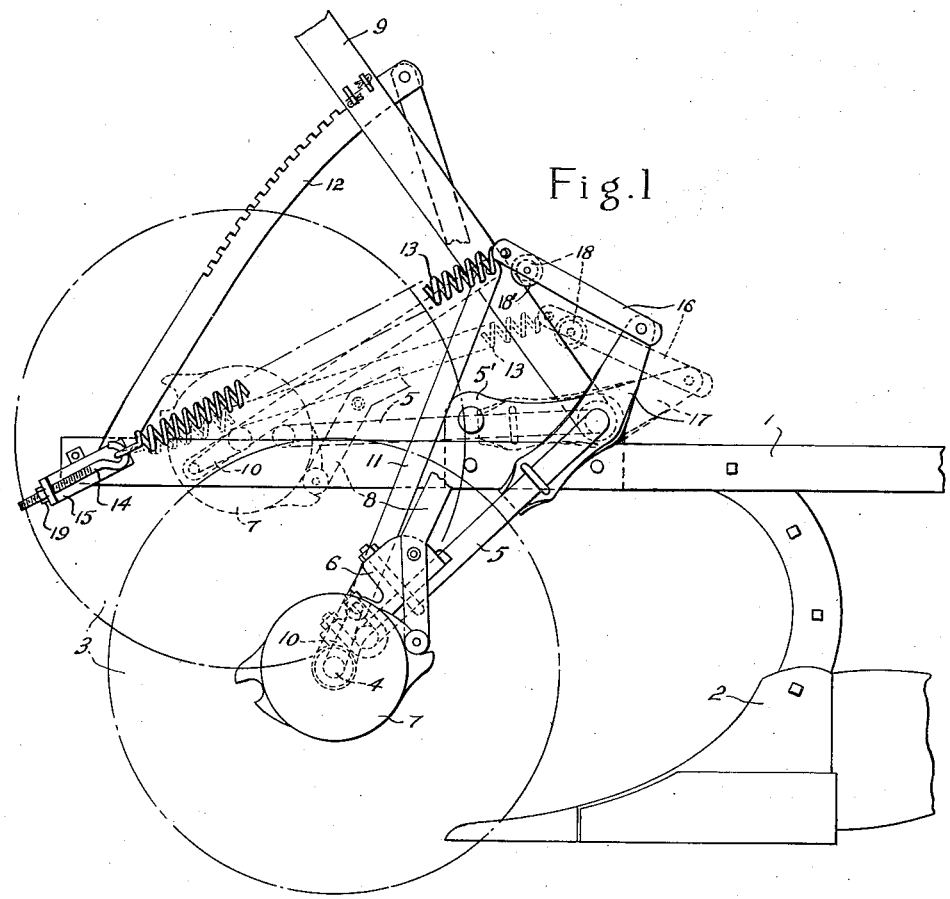
Figure 2:
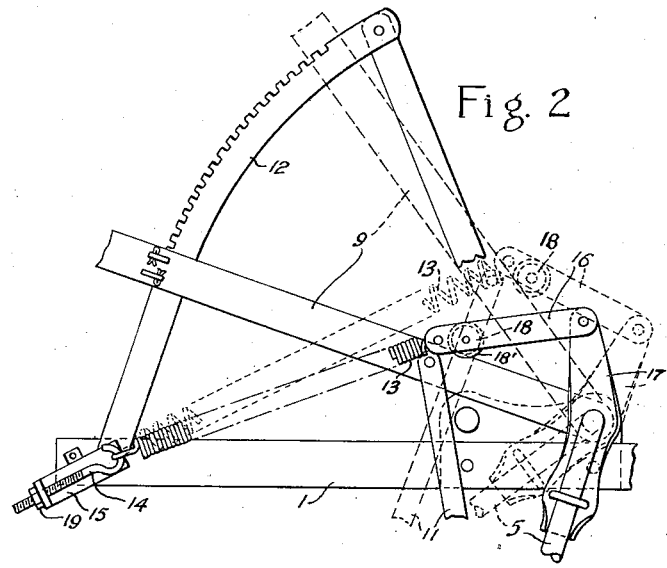

The invention will be described with reference to the accompanying drawing which illustrates the device as applied to a plow and in which, Figures 1 and 2 are partial side elevations of the plow showing the device in various positions.

In the drawing, 1 indicates one of the beams of the plow frame, 2 one of the earth engaging elements or plow bodies suspended from the beam and 3 the land wheel. The wheel 3 is journalled on a shaft 4 which is secured to a crank axle 5 by means of a bracket 6. The axle 5 is journalled in a hanger bracket 5' bolted to the beam 1. A power lift mechanism 7, having an actuating lever 8, is provided in association with the land wheel.

A land lever 9 is pivoted on the axle 5 and a connecting rod 11 pivoted to the lever connects the latter to a crank 10 secured to or integral with the end of shaft 4. It will be observed that, with the power lift mechanism locked in disengaged position, as shown in Figure 1, swinging of the lever downwardly will act to raise the plow beam and swinging of the lever upwardly will act to lower the plow beam. The lever carries a suitable manually operable detent for cooperation with the teeth of a segment 12 mounted on the plow frame for holding the lever in any set position.

In accordance with the invention, an improved spring arrangement is provided for assisting the operator in the downward movement of the lever 9 to raise the plow beam. This arrangement comprises a coil spring 13 having one end attached to a hook bolt 14 carried by a bracket 15 mounted on the forward end of beam 1 and the other end attached to one end of a link 16. The other end of link 16 is pivoted to an upwardly extending arm 17 fixed to the axle 5. The link 16 carries a laterally extending roller 18 adjacent its first-mentioned end and this roller bears upon the upper or right hand edge of lever 9 to transmit the downward pulling force of the spring to the lever. A flange 18' on the roller serves to maintain it in position on the edge of the lever. Initial tension of the spring 13 is adjusted by means of a nut 19 on hook bolt 14.

It will be observed that when the crank axle 5 is swung to raise or lower the plow beam by means of the power lift mechanism, the arm 17 will also be swung to move link 16, the roller 18 rolling along the edge of lever 9 in an upward or downward direction as the case may be. The end of spring 13 attached to link 16 is thus changed from one pressure exerting point to another on lever 9 and the tension of the spring is increased or decreased according to its downward or upward movement.

Figure 1 shows the lever 9 in its extreme raised position with the plow beam lowered thereby. The full lines indicate the position of the parts with the plow beam and bodies held out of earth-engaging relation by means of the power lift mechanism and the dotted lines indicate the relative position of the parts when the lift mechanism has been tripped to drop the beam and bodies into earth-engaging relation. The consequent change in the relative position of the spring 13 with respect to the lever 9 and in the pulling force exerted thereby on the lever is also indicated in dotted lines.

Figure 2 illustrates in full lines the position of the assisting spring arrangement when the lever 9 is in its extreme lowered position and in dotted lines the relative position of the parts when the lever is in its extreme raised position.

The tension of the spring is increased with upward movement of the lever 9 and lowering of the plow beam. This increased tension, as previously described, assists the operator in the downward movement of the lever to raise the plow beam.

The arrangement described enables the spring to be set at a proper tension in any one position to maintain a pulling force of satisfactory value on the land lever, which force will automatically alter with movement of the plow beam by the lift mechanism. This change in the pulling force is effected by shifting the point of application on the lever. The shifting of the force application point not only in itself varies the pulling force on the lever but also alters the tension of the spring to affect the pulling force applied. An arrangement is thus provided in which the pulling force is so controlled as to provide a maximum degree of assistance to the operator in all positions of the plow beam. Moreover, no undue strain is placed on the spring or associated bearings in any position in which the lever is set since the proper tension is maintained in the spring at all times.

I claim:

1. In an earth-working implement having a wheel-supported frame carrying earth working units, a lift mechanism for raising or lowering said frame and a lever manually operable to adjust the level of said frame, resilient means exerting a force on said lever in one direction and means whereby the point of application of said force on the lever is shiftable in response to movement of the frame by said lift mechanism.

2. In an earth-working implement having a frame carrying earth working units, a crank axle in the frame, means for swinging said crank to raise or lower the frame and a lever associated with said means and manually operable to swing said crank to adjust the level of the frame, resilient means exerting a force on said lever in one direction and means whereby the point of application of said force on the lever is shiftable in response to swinging of said crank by said first-mentioned means.

3. In an earth working implement having a frame carrying earth working units, a wheel-supported crank axle in the frame, means for revolving the crank in said axle to raise or lower said frame and units, and a lever connected to the axle and to said means and being manually operable to adjust the level of the frame, a member having shiftable engagement with said lever, and a spring having one end connected to the frame and the other end connected to said member, said member being freely shiftable in response to revolution of said crank by said means.

4. The combination with an earth working implement having a frame carrying earth working units, a wheel supported crank axle in the frame, means for revolving the crank in said axle to raise or lower said frame and units, and a lever connected to the axle and to said means and being manually operable to adjust the level of the frame, of an arm fixed to the axle, a link pivoted at one end to said arm and having a roller adjacent its other end engaging said lever, and a spring connected to the latter end of said link and to said frame.

G. R. EGO.